Dec. 2, 1941.  L. G. SIMPSON  2,264,813

METHOD AND APPARATUS FOR GRINDING ONE-PIECE MULTIFOCAL LENSES

Filed Dec. 2, 1939  2 Sheets-Sheet 1

LEON G. SIMPSON
INVENTOR
BY
ATTORNEYS

Dec. 2, 1941.  L. G. SIMPSON  2,264,813
METHOD AND APPARATUS FOR GRINDING ONE-PIECE MULTIFOCAL LENSES
Filed Dec. 2, 1939  2 Sheets-Sheet 2
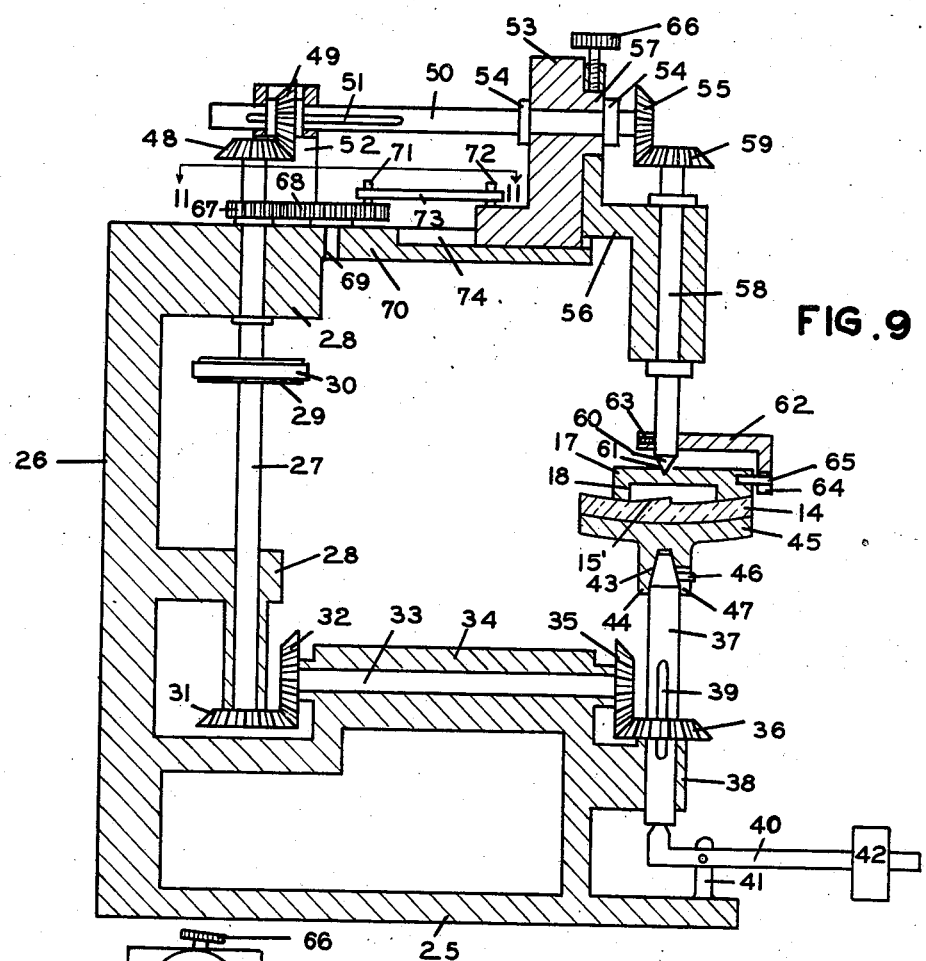
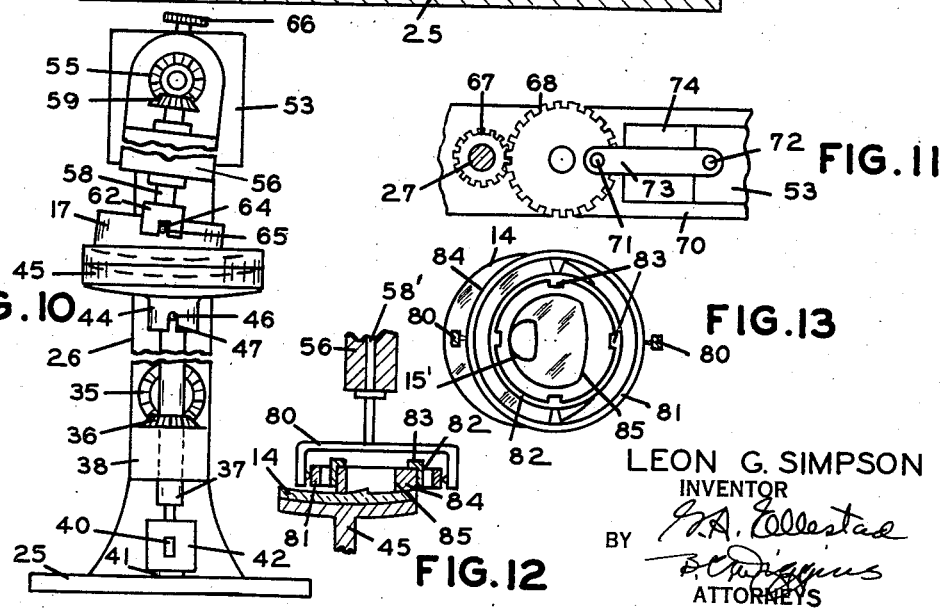
LEON G. SIMPSON
INVENTOR Patented Dec. 2, 1941

2,264,813

UNITED STATES PATENT OFFICE 2,264,813

METHOD AND APPARATUS FOR GRINDING ONE-PIECE MULTIFOCAL LENSES

Leon G. Simpson, Rochester, N. Y., assignor to Bausch & Lomb Optical Company, Rochester, N. Y., a corporation of New York Application December 2, 1939, Serial No. 307,284

5 Claims. (Cl. 51—56)

The present invention relates to a method and apparatus for grinding lenses and more particularly to a method and apparatus for grinding one-piece multifocal lenses.

One of the objects of the present invention is to provide a method of grinding one-piece multifocal lenses with segments of any desired size or shape. Another object is to provide a method of grinding the distance portion of a one-piece multifocal lens in a smooth and uniform curve up to a non-circular segment. A further object is to provide a simple apparatus for grinding one-piece multifocal lenses with non-circular segments. Still another object is to provide a new and improved tool for grinding one-piece multifocal lenses. These and other objects and advantages reside in certain novel features of construction, arrangement and combination of parts and processes as will hereinafter be more fully set forth and pointed out in the appended claims.

In the drawings:

Fig. 9 is a vertical section of an apparatus embodying my invention.

Fig. 10 is a front elevation thereof.

Fig. 11 is a view taken on line 11—11 of Fig. 9.

Fig. 12 is a vertical section of a modified form of tool holder.

Fig. 13 is a plan view thereof.

Figure 2:
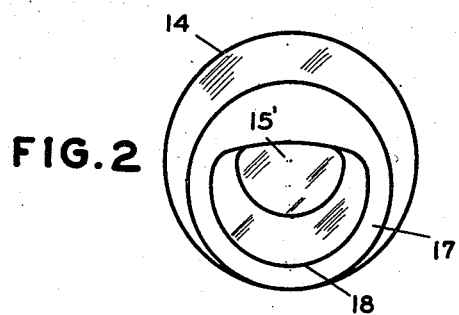
Figs. 2, 3 and 4 show the different relative positions of the lens and tool during the grinding process.

One-piece bifocal lenses have some advantageous and desirable properties but manufacturing difficulties restricting the shape and prism power of the segment and the distance between the optical centers of the segment and the distance portion, have limited their application. Heretofore, these lenses have been made with circular segments and the prism power of the segment and the distance between the optical centers of the segment and distance portion have been dependent chiefly on the lens power of the segment and of the distance portion. According to the present invention, one-piece bifocal lenses can be made with a segment of any shape or size and with the prism power and the distance between the optical centers entirely independent of the power of either the segment or the distance portion.

The manner in which this result is obtained can best be understood by reference to Figs. 1 to 8. In grinding a lens according to my invention, I prefer to start with a blank 14 having a central portion 15 ground and polished to the curvature desired for the segment and having rough or diamond ground outer portions 16. The outer portion 16 and a part of the central portion 15 are then ground away leaving a segment 15' of the desired shape and prism power and with its optical center in the desired location.

The part of the blank 14 beyond the segment 15' is ground with a tool 17 which is formed of suitable material such as metal with a central recess or aperture 18 of the shape to which the segment 15' is to be formed. This aperture 18 is larger than the segment 15' but the segment 15' takes its form from the aperture 18. The grinding surface of the tool 17 is formed to the curve desired for the distance portion of the lens and the recess 18 meets this grinding surface at a sharp edge.

Figure 3:
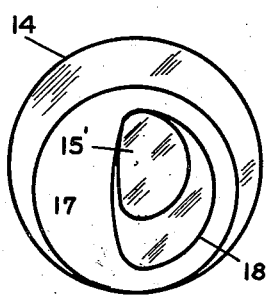
Figure 4:
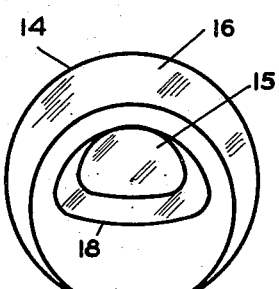

The tool 17 is placed in contact with the surface of the blank 14 and the blank and tool are moved relative to each other but without relative rotation. In order that the segment 15' take the shape of the recess 18, the segment and the recess must always be moved together at the same speed, as for example by simultaneous rotation, and in the same relative directions. That is, their major and minor axes must always be parallel. During the relative movement it is also desirable, if not essential, that a portion of the inner edge of the recess 18 be in grinding contact with a corresponding portion of the segment 15'. By maintaining continuous grinding action along the joint between the segment and distance portion, a sharp joint is insured and the distance portion will be completely ground and polished to a true curve right up to this joint. Figs. 2, 3 and 4 show successive relative positions of the lens blank and tool during this grinding.

Figure 5:
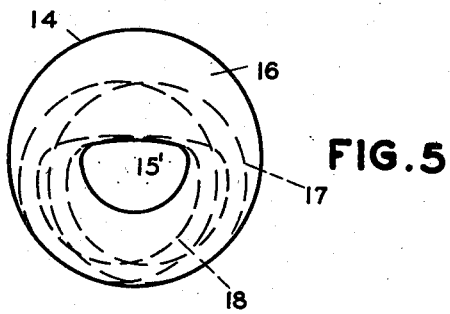
Figs. 5, 6 and 7 show the action of the break-up movement in the positions shown in Figs. 2, 3 and 4, respectively.
Figure 6:
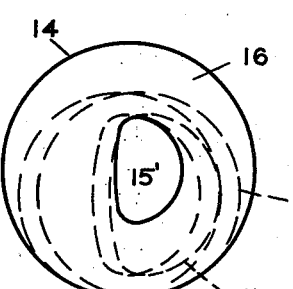
Figure 7:
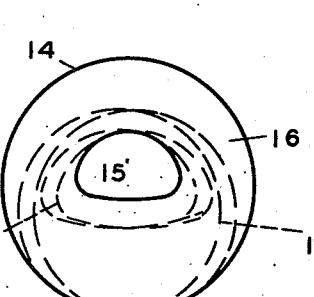
Figure 1:
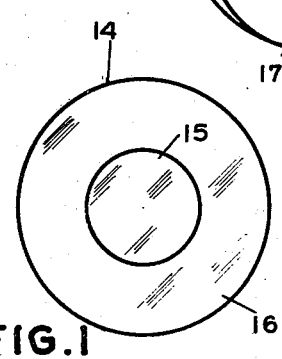
Fig. 1 is a plan view of a lens blank prior to being ground according to my new method.

It may be necessary or desirable to provide a break-up movement during the grinding to prevent the formation of waves or ridges in the distance portion of the lens blank. Figs. 5, 6 and 7 show a suitable break-up movement when the lens blank and tool are in the position shown in Figs. 2, 3 and 4, respectively. This break-up movement is preferably a linear relative movement between the lens blank 14 and tool 17 along the common tangent of the segment 15' and the recess 18. The extremes of this movement are illustrated in Figs. 5, 6 and 7 by the dotted outlines of the tool.

Figure 8:
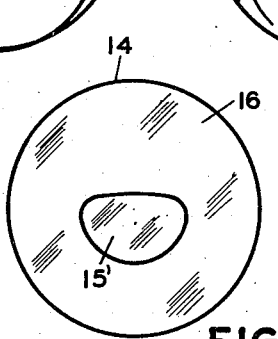
Fig. 8 illustrates a finished lens ground according to my invention.

With the edge of the aperture 18 in continuous grinding contact with a corresponding portion of the segment 15', the introduction of the break-up movement along this line of contact further insures complete and even grinding right up to the edge of the segment. The edge of the segment 15' will then be sharp and well defined as illustrated in Fig. 8.

A simple apparatus for practicing my new method is illustrated in Figs. 9 to 13 wherein 25 designates a base to which is fixed an upright 26. A vertical shaft 27 is journalled in bearings 28 fixed to the upright 26 and carries a pulley 29 which is driven by a suitable belt 30. A bevel gear 31 is secured on the lower end of the shaft 27 and drives a bevel gear 32 on the rear end of a horizontal shaft 33 which is journalled in a bearing 34 on the base 25.

A bevel gear 35 is fastened on the front end of the shaft 33 and drives a bevel gear 36. A vertical spindle 37 which is slidably and rotatably journalled in a bearing 38 extends upward through the bevel gear 36. The spindle 37 is free to slide longitudinally through the bevel gear 36 but it is rotated by the gear 36 through a key, not shown, which engages in a keyway 39 in the spindle 37. A lever 40 is pivotally mounted on lugs 41 secured on the base 25 and one arm of this lever 40 bears upward against the bottom of the spindle 37. A weight 42 is slidably mounted on the other arm of the lever 40 to vary the upward grinding pressure on the spindle 37.

The top of the spindle 37 is tapered as indicated at 43 to receive the socket 44 of a lens holder 45. A suitable pin 46 is secured near the end of the spindle for engaging a slot 47 in the socket 44. This insures proper repositioning of the lens holder 45 if the holder is removed for any reason during the process. The lens blank 14 may be secured on the holder 45 by any suitable means.

A bevel gear 48 is fastened on the upper end of the shaft 27 and drives a bevel gear 49. A horizontal shaft 50 is longitudinally slidable through the bevel gear 49 but is driven by the gear 49 through a key, not shown, which engages in a keyway 51. A bracket 52, fixed on the upper bearing 28 is bifurcated at its upper end and forms journals for the shaft 50 on both sides of the bevel gear 49 and holds the gear 49 against longitudinal movement.

The forward end of the shaft 50 is journalled in a slide 53 and is held against longitudinal movement relative to the slide 53 by collars 54. A bevel gear 55 is fixed on the outer end of the shaft 50. A bracket 56 is pivotally mounted on a bearing sleeve 57 on the slide 53 concentric with the shaft 50 and a spindle 58 is journalled in the bracket 56. A bevel gear 59 on the spindle 58 engages the gear 55. The various bevel gears 31, 32, 35, 36, 48, 49, 55 and 59 are of such relative size and are so arranged that the two spindles 37 and 58 rotate in the same direction at the same speed.

The lower end of the spindle 58 has a bearing point 60 which engages in a depression 61 in the back of the tool 17. An adjustable L-shaped arm 62 is secured to the spindle 58 by a set screw 63 and extends downward beyond the edge of the tool 17. The lower end of the arm 62 is bifurcated at 64 to receive a pin 65 on the tool 17 so that the spindle 58 rotates the tool while leaving the tool free to accommodate itself to the surface of the lens blank 14.

The recess 18 in the tool 17 is made in the shape which the segment 15' is to have but is made much larger than the segment. In order to grind the blank 14 so that the segment 15' will be of the desired size, the lens blank 14 is mounted on the holder 45 with the center of the segment 15' on the axis of rotation of the spindle 37 and the tool 17 is so made that the center of the recess 18 will lie on the axis of rotation of the spindle 58. The tool 17 is moved laterally relative to the lens blank 14 by rotating the bracket 56 on the bearing sleeve 57 until the position of a portion of the edge of the recess 18 corresponds with the position of a similar portion of the segment to be ground. Figs. 2 to 4 illustrate such corresponding positions. The bracket 56 is then locked in position by a set screw 66.

The fact that the tool 17 is a "floating" tool permits the grinding of a number of sizes of segment regardless of the curve to be ground on the distance portion of the blank. In using a fixed tool, the lateral displacement between the lens blank and tool would be determined principally by the curve to be ground and the size of the segment would then be dependent only on the size of the recess.

The break-up movement is operated by a spur gear 67 fixed on the shaft 27. This gear 67 drives a spur gear 68 which is mounted on a stud 69 journalled in a shelf 70 which projects forwardly from the upper bearing 28. A crank pin 71 on the gear 68 is connected to a pin 72 on the slide 53 by a rigid link 73 and serves to reciprocate the slide 53 in a bearing groove or guide 74 in the shelf 70. This reciprocating movement is perpendicular to the lateral displacement of the tool so that the linear break-up movement takes place along the line of contact, the common tangent of the recess 18 and segment 15'.

A modified form of tool and holder is illustrated in Figs. 12 and 13 wherein a fork 80 is rigidly fixed on the lower end of the spindle 58'. The outer ring 81 of a pair of gimbal rings is pivotally mounted in the fork 80 and the inner ring 82, which is pivotally mounted in the ring 81, has a cylindrical inner surface terminating in a plurality of inwardly projecting lugs 83. The tool 84 has an aperture 85 extending entirely through its length from the grinding surface. This tool 84 with its aperture 85 performs the same grinding function as the tool 17 with the recess 18 but it has two further advantages. With the aperture 85 extending entirely through the tool 84, the operator can observe the grinding action at the edge of the segment and can supply abrasive through the aperture 85. This type of tool is particularly advantageous in the polishing operation when the tool must be located accurately with respect to the segment which is already formed.

From the foregoing, it will be apparent that I am able to attain the objects of my invention and provide a new method and apparatus for grinding one-piece multifocal lenses with noncircular segments. Throughout the specification and claims, the term grinding is intended to include both grinding and polishing as the method and apparatus described comprehends both. Various modifications and alterations of structure and procedure can, of course, be made without departing from the spirit of my invention or the scope of the appended claims.

I claim:

1. The method of grinding a one-piece multifocal lens blank having a segment of a non-circular shape, comprising placing a grinding tool provided with a non-circular recess having a profile at the grinding surface of the tool like the profile of the segment but having an area greater than the area of the segment in grinding contact with the lens blank in such position on the lens blank that a portion of the edge of the recess contacts a corresponding similar portion on the edge of the segment, rotating the tool and the lens blank in the same direction and the same rate of speed while moving the tool and the lens blank relative to each other along a tangent common to said recess and to said segment.

2. The method of grinding a one-piece multifocal lens blank having a segment of a non-circular shape, comprising placing a grinding tool provided with a non-circular recess having a profile at the grinding surface of the tool like the profile of the segment but having an area greater than the area of the segment in grinding contact with the lens blank, rotating the lens blank about an axis, and rotating the tool in contact with the lens blank at the same speed and in the same direction as the lens blank about a second axis eccentric with respect to the first named axis by a distance determined by positioning any portion of the edge of said recess in contact with a corresponding similar portion of the edge of said segment while supporting the tool for freedom of movement relative to the lens blank imparted to the tool by the eccentricity of said axes.

3. An apparatus for grinding one-piece multifocal lens blanks having a segment of non-circular shape comprising a support, a spindle rotatably carried by said support, means for securing a lens blank to be ground on said spindle, a grinding tool having a non-circular recess with a profile at the grinding surface of the tool of substantially the same shape as the profile of the segment but having an area greater than the area of the segment, a second spindle rotatably carried by said support for holding said tool in contact with said lens blank, floating connection means operatively connecting said tool to said second spindle whereby to permit freedom of movement of the tool relative to said lens blank during the operation of the apparatus, said spindles being out of alignment by a distance dependent upon the size and the shape of the profile of the recess, and means for rotating said spindles in the same direction at substantially the same speed.

4. An apparatus for grinding one-piece multifocal lens blanks having a segment of non-circular shape comprising a support, a spindle rotatably carried by said support, means on one end of said spindle for supporting a lens blank to be ground, a bracket adjustably carried by said support adjacent said one end of said spindle, a second spindle rotatably carried by said bracket in opposed relation to the first-named spindle, a lens grinding tool having a non-circular recess with a profile at the grinding surface of the tool of substantially the same shape as the profile of the segment but having an area greater than the area of the segment, cooperating means on said second spindle and said tool for operatively interconnecting said second spindle and tool, said bracket adjustable of said support in a direction to move said second spindle transversely of the first spindle, means for locking said bracket in an adjusted position wherein a portion of the recess of the tool is in contact with a corresponding similar portion of the edge of the segment to be ground, and means for rotating both spindles in the same direction at substantially the same speed.

5. An apparatus for grinding one-piece multifocal lens blanks having a segment of non-circular shape comprising a support, a spindle rotatably carried by said support, means on one ends of said spindle for supporting a lens blank to be ground, a slide member slidable on said support, a bracket adjustably carried by said slide member, a second spindle rotatably carried by said bracket in opposed relation to the first-named spindle, a lens grinding tool having a non-circular recess with a profile at the grinding surface of the tool of substantially the same shape as the profile of the segment but of an area greater than the area of the segment, cooperating means on said second spindle and tool for operatively interconnecting said second spindle and said tool, said bracket adjustable of said slide member in a direction to move the second spindle transversely of the first spindle, means for locking said bracket in an adjusted position wherein a portion of the edge of the recess in the tool is in contact with a corresponding similar portion of the edge of the segment to be ground, drive means for rotating both spindles in the same direction at substantially the same speed, and means interconnected with said drive means for reciprocating said slide member whereby to move said tool back and forth along a tangent common to the edge of the recess and the edge of the segment to be ground.

LEON G. SIMPSON.